US012565239B2

(12) United States Patent
        Kim et al.

(10) Patent No.: US 12,565,239 B2
(45) Date of Patent: Mar. 3, 2026

(54) AUTONOMOUS DRIVING PREDICTIVE DEFENSIVE DRIVING SYSTEM THROUGH INTERACTION BASED ON FORWARD VEHICLE DRIVING AND SITUATION JUDGEMENT INFORMATION

(71) Applicant: ELECTRONICS AND TELECOMMUNICATIONS RESEARCH INSTITUTE, Daejeon (KR)

(72) Inventors: JinWoo Kim, Daejeon (KR); Ki Tae Kim, Daejeon (KR); MyongWook Park, Daejeon (KR); Yoo-Seung Song, Daejeon (KR); Kyoung Hwan An, Daejeon (KR); Shin Kyung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 126 days.

(21) Appl. No.: 18/485,607

(22) Filed: Oct. 12, 2023

(65) Prior Publication Data

US 2024/0124025 A1 Apr. 18, 2024

(30) Foreign Application Priority Data

Oct. 13, 2022 (KR) ........................ 10-2022-0131404
Oct. 6, 2023 (KR) ........................ 10-2023-0133238

(51) Int. Cl.
B60W 60/00 (2020.01)
G08G 1/01 (2006.01)
(Continued)

(52) U.S. Cl.
CPC .. B60W 60/0016 (2020.02); B60W 60/00272 (2020.02); G08G 1/0112 (2013.01);
(Continued)

(58) Field of Classification Search
CPC ....... B60W 60/0016; B60W 60/00272; B60W 2556/65; B60W 2554/80;
(Continued)

(56) References Cited

U.S. PATENT DOCUMENTS 8,738,197 B2 5/2014 An et al.
10,493,988 B2 12/2019 Liu et al.
(Continued)

FOREIGN PATENT DOCUMENTS

EP 3709280 A1 9/2020
KR 1020200101301 A 8/2020
KR 102328732 B1 11/2021

*Primary Examiner* — Mohamad O El Sayah
(74) *Attorney, Agent, or Firm* — Rabin & Berdo, P.C.

(57) ABSTRACT

The present disclosure relates to a defensive driving vehicles interaction system (D2VIS), and to an autonomous driving predictive defensive driving system through an interaction based on forward vehicle driving and situation judgement information and a method thereof. An autonomous driving predictive defensive driving system through an interaction based on forward vehicle driving and situation judgement information according to the present disclosure includes an inter-vehicle distance recognition unit configured to recognize a distance between a surrounding vehicle and an ego vehicle, a situation recognition unit configured to recognize situation information including surrounding information of the surrounding vehicle, and a driving situation response determination unit configured to share data for determining a defensive driving action by using the situation information.

2 Claims, 9 Drawing Sheets

(51) Int. Cl.
  *G08G 1/017* (2006.01)
  *G08G 1/16* (2006.01)
(52) U.S. Cl.
  CPC ........... *G08G 1/0175* (2013.01); *G08G 1/161*
    (2013.01); *B60W 2420/403* (2013.01); *B60W*
    *2554/80* (2020.02); *B60W 2556/65* (2020.02)
(58) Field of Classification Search
  CPC ........... B60W 2420/403; G08G 1/0112; G08G
    1/0175; G08G 1/161
  See application file for complete search history.

(56) References Cited

U.S. PATENT DOCUMENTS

| | | | | |
|---|---|---|---|---|
| 11,645,775 | B1 * | 5/2023 | Ganguli | G06T 7/593 |
| | | | | 382/103 |
| 12,065,140 | B1 * | 8/2024 | Pronovost | B60W 40/04 |
| 2015/0187216 | A1 | 7/2015 | Kwak | |
| 2018/0244275 | A1 * | 8/2018 | Bremkens | B60W 30/18163 |
| 2019/0031189 | A1 * | 1/2019 | Patana | B60W 10/20 |
| 2019/0168754 | A1 * | 6/2019 | Makled | B60W 30/16 |
| 2019/0283739 | A1 * | 9/2019 | Kim | B60W 30/0953 |
| 2019/0315343 | A1 * | 10/2019 | Steffey | G05D 1/0257 |
| 2019/0329772 | A1 * | 10/2019 | Graves | B60W 30/16 |
| 2020/0062249 | A1 | 2/2020 | Light et al. | |
| 2020/0200855 | A1 * | 6/2020 | Newman | G07C 5/0841 |
| 2020/0324781 | A1 | 10/2020 | Hayakawa et al. | |
| 2020/0342760 | A1 * | 10/2020 | Vassilovski | G05D 1/22 |
| 2021/0049774 | A1 * | 2/2021 | Zink | G06V 10/443 |
| 2021/0056845 | A1 * | 2/2021 | Zheng | G08G 1/161 |
| 2021/0370973 | A1 * | 12/2021 | Kazuyuki | B60W 60/0017 |
| 2022/0012503 | A1 * | 1/2022 | Peppoloni | G06V 20/56 |
| 2022/0262131 | A1 * | 8/2022 | Tamanaha | B60W 10/18 |
| 2022/0324422 | A1 * | 10/2022 | Lee | B60W 10/18 |
| 2023/0065727 | A1 * | 3/2023 | Yang | H04W 4/46 |
| 2023/0169864 | A1 * | 6/2023 | Kim | G08G 1/166 |
| 2023/0222914 | A1 * | 7/2023 | Zhou | G08G 1/166 |

* cited by examiner

FIG. 3

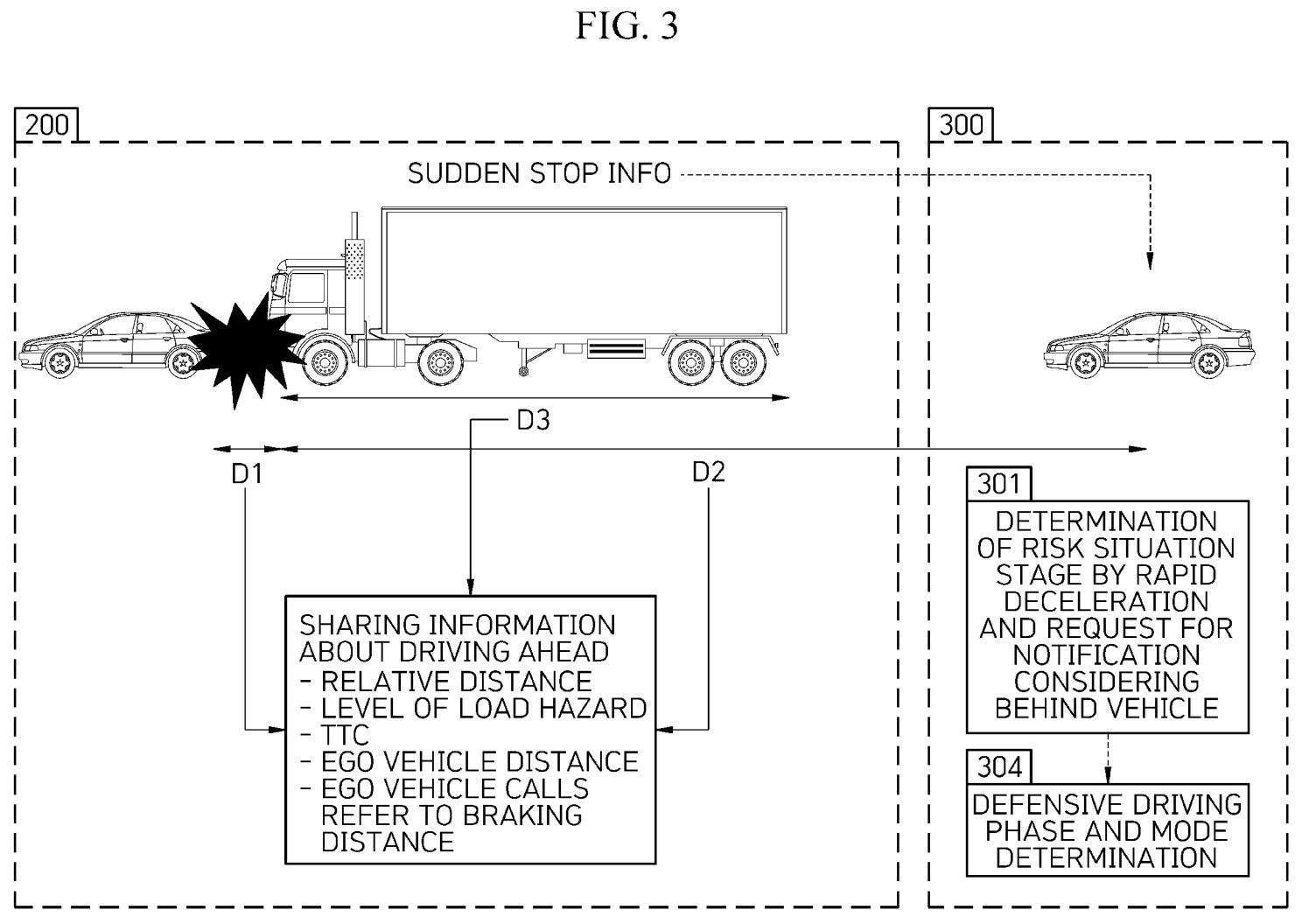

SUDDEN STOP INFO

D3

D2

D1

200

300

301 DETERMINATION OF RISK SITUATION STAGE BY RAPID DECELERATION AND REQUEST FOR NOTIFICATION CONSIDERING BEHIND VEHICLE

304 DEFENSIVE DRIVING PHASE AND MODE DETERMINATION

SHARING INFORMATION ABOUT DRIVING AHEAD
- RELATIVE DISTANCE
- LEVEL OF LOAD HAZARD
- TTC
- EGO VEHICLE DISTANCE
- EGO VEHICLE CALLS
REFER TO BRAKING DISTANCE

Figure 4:
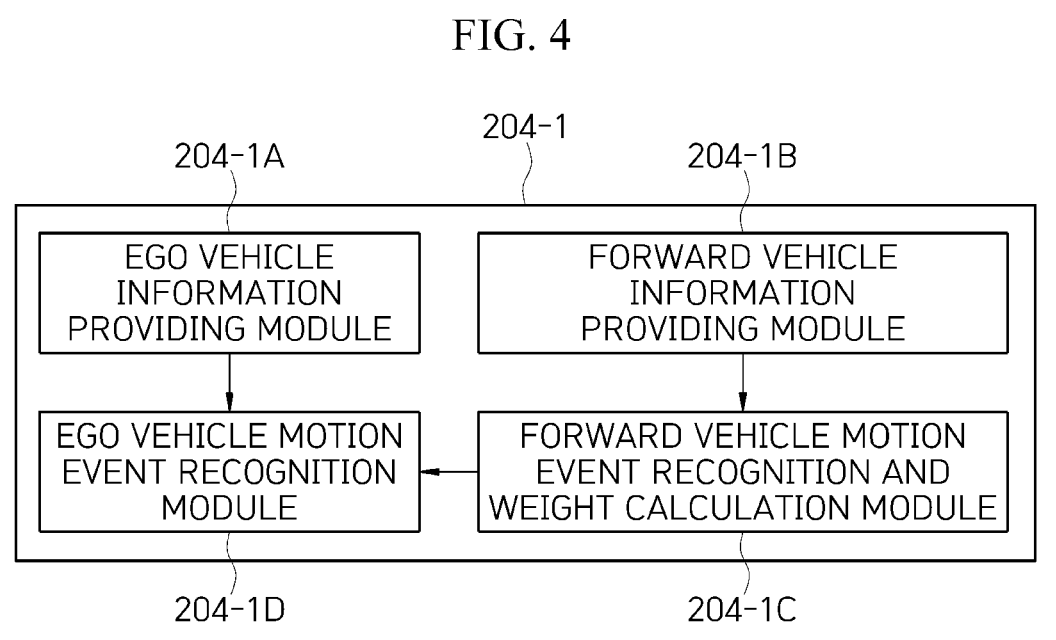

| EGO VEHICLE INFORMATION PROVIDING MODULE | FORWARD VEHICLE INFORMATION PROVIDING MODULE |
|---|---|
| EGO VEHICLE MOTION EVENT RECOGNITION MODULE | FORWARD VEHICLE MOTION EVENT RECOGNITION AND WEIGHT CALCULATION MODULE |

204-1D            204-1C

MATCHING GPS TRAJECTORY

FIG. 6

AUTONOMOUS DRIVING PREDICTIVE DEFENSIVE DRIVING SYSTEM THROUGH INTERACTION BASED ON FORWARD VEHICLE DRIVING AND SITUATION JUDGEMENT INFORMATION

CROSS-REFERENCE TO RELATED APPLICATION

This application claims priority to and the benefit of Korean Patent Application Nos. 10-2022-0131404, field on Oct. 13, 2022, and 10-2023-0133238, field on Oct. 6, 2023, the disclosures of which are incorporated herein by reference in its entirety.

BACKGROUND

1. Technical Field

The present disclosure relates to a defensive driving vehicles interaction system (D2VIS), and to an autonomous driving predictive defensive driving system through an interaction based on forward vehicle driving and situation judgement information and a method thereof.

2. Related Art

According to road traffic laws, vehicle drivers have the obligation to drive while maintaining an inter-vehicle distance depending on the road environment, but rear-end or serial collision accidents occur due to various factors such as road situations, driver's negligence, or unintentional violation of inter-vehicle distance maintenance regulations.

While the number of autonomous vehicles or vehicles equipped with driving assistance systems increase, specific solutions related to a problem of rear-end collision accidents due to sudden braking of a forward vehicle have not been proposed.

SUMMARY

Various embodiments are directed to constructing an autonomous driving system that enables defensive driving by confirming the surrounding situation to predict a driving situation after the current time point and sharing information obtained by a vehicle. Through this, reliability and stability in the use of an autonomous driving and connected vehicle are improved.

An autonomous driving predictive defensive driving system through an interaction based on forward vehicle driving and situation judgement information according to the present disclosure includes an inter-vehicle distance recognition unit configured to recognize a distance between a surrounding vehicle and an ego vehicle, a situation recognition unit configured to recognize situation information including surrounding information of the surrounding vehicle, and a driving situation response determination unit configured to share data for determining a defensive driving action by using the situation information.

The inter-vehicle distance recognition unit recognizes the distance by photographing a rear of a forward vehicle and a front of a rear vehicle by using a mono camera, estimating a location and a speed of the surrounding vehicle, and using specifications and braking characteristic information of the ego vehicle.

The inter-vehicle distance recognition unit uses a result of converting an image acquired using the mono camera into mono depth, classifies the surrounding vehicle, and generates tracking information.

The inter-vehicle distance recognition unit acquires location information by using a track ID for the surrounding vehicle, and tracks the surrounding vehicle in a domain.

The situation recognition unit performs classification of cargo vehicles and determines a target object by using information of the surrounding vehicle.

The situation recognition unit generates and shares a risk level and collision time information by using the information of the surrounding vehicle and motion information of the ego vehicle.

The situation recognition unit determines a weight by performing event recognition on a motion of the forward vehicle.

The driving situation response determination unit determines a dangerous state and transmits dangerous state information to a vehicle within a preset service range according to the dangerous state.

The driving situation response determination unit determines whether to designate a forward vehicle as a target vehicle by using GPS or depth-based path information in an image, and generates and shares driving strategy information for responding to dangerous situations based on state information of the forward vehicle, state information of a rear vehicle, and state information of the ego vehicle.

The present disclosure has the effect of solving, by using a situation judgement logic, serial collision risk that occurs due to when a vehicle driving in front stops due to an accident on a highway or automobile road or when a vehicle driving in front suddenly cuts in front of an ego vehicle.

Unlike mass-produced auxiliary systems and autonomous systems in the related art that simply utilize only a distance between a forward vehicle and a driving vehicle, the present disclosure can preemptively prepare a response of an ego vehicle by monitoring motion events noticed by an ego vehicle and situation information that may be generated by surrounding vehicles.

The present disclosure can construct a block-type defensive driving system by providing a rear vehicle with forward situation recognition information and motion judgement information provided by a forward vehicle.

Effects of the present disclosure which may be obtained in the present disclosure are not limited to the aforementioned effects, and other effects not described above may be evidently understood by a person having ordinary knowledge in the art to which the present disclosure pertains from the following description.

BRIEF DESCRIPTION OF THE DRAWINGS

FIG. 3 is a diagram illustrating defensive driving data sharing through forward vehicle situation analysis according to an embodiment of the present disclosure.

FIG. 4 is a diagram illustrating a risk level analysis method using ego vehicle movement information according to an embodiment of the present disclosure.

FIG. 6 is a block diagram illustrating a computer system for implementing a method according to an embodiment of the present disclosure.

DETAILED DESCRIPTION

Figure 1:
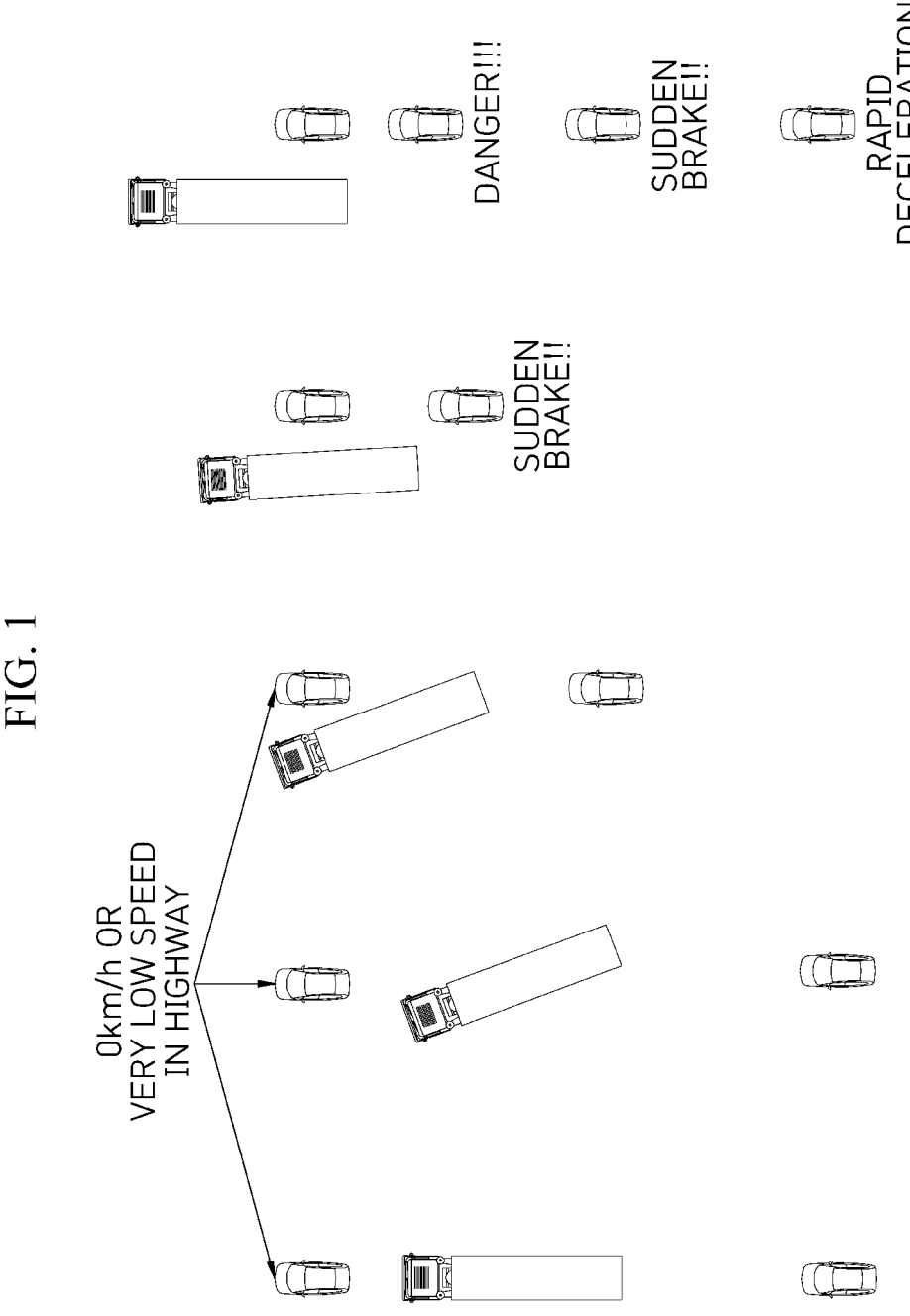
FIG. 1 is a diagram illustrating a dangerous situation that may occur due to obscuring on the same driving path according to an embodiment of the present disclosure.

Advantages and characteristics of the present disclosure and a method for achieving the advantages and characteristics will become apparent from the embodiments described in detail later in conjunction with the accompanying drawings.

However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements, steps, operations, and/or elements in addition to a mentioned element, step, operation, and/or element.

Hereinafter, a proposed background of the present disclosure is first described and an embodiment of the present disclosure is then described. The number of autonomous vehicles and vehicles equipped with driving assistance systems is gradually increasing. The driving assistance functions installed in vehicles driving on a road are different at various levels. In order to respond to the risk of a rear-end collision due to sudden braking of a forward vehicle, a method of providing images of a situation in front of a vehicle in a see-through format and a method of sharing information through V2V communication have been proposed in the related art. However, the related art is a conceptualized technical proposal that can merely provide assistance by providing information, and does not present details at a level for application to actual defensive driving functions. That is, the related art intends to establish a safe and efficient driving system by providing information about dangerous situations and special situations to surrounding vehicles or opposing vehicles through V2V and V2I communication. However, there has been no proposal regarding a specific configuration for system construction, and there has been no proposal regarding a specific configuration for recognizing the surrounding situation of a forward vehicle and integrating and sharing predicted driving situation information.

The present disclosure has been proposed to solve the above-mentioned problem, and proposes a system in which each driving vehicle becomes a subject, shares risk analysis information about the surrounding situation perceived by each vehicle, and shares the risk analysis information with vehicles at high risk of collision. An embodiment of the present disclosure establishes a defensive driving system that prevents sudden stops and collision accidents of rear vehicles by recognizing and predicting the driving situation based on the forward situation obscured by a forward vehicle and state information of surrounding vehicles. An embodiment of the present disclosure proposes an artificial intelligence-based autonomous driving technology applicable to autonomous vehicles, connected vehicles, black boxes, and navigation systems. An autonomous driving predictive defensive driving system according to an embodiment of the present disclosure provides a smooth response strategy to prevent emergency deceleration, collision with a forward vehicle, and collision with a rear vehicle when the forward situation obscured by the forward vehicle is an emergency situation. An embodiment of the present disclosure prevents collisions or serial collisions by not only simply sharing object information recognized by a forward vehicle, but also providing dangerous situation recognition information and response action information to surrounding vehicles (particularly, rear vehicles of an ego vehicle) based on information recognized by the surrounding vehicles and state information recognized by an ego vehicle.

An autonomous driving predictive defensive driving system according to an embodiment of the present disclosure recognizes an inter-vehicle distance by using information about the rear of a forward vehicle, information about vehicle specifications, and information about braking characteristics, based on a mono camera. In situations where there is no sensor information using cameras, radars, LiDAR, or the like, emergency avoidance is possible through the motion of an ego vehicle while driving and driver intervention or driving assistance monitoring (minimum risk maneuver (MRM)) in autonomous driving or driving assistance state. An autonomous driving predictive defensive driving system according to an embodiment of the present disclosure recognizes the situation by integrating surrounding vehicle information and recognizable object action recognition information recognized by a forward vehicle and determines a response to driving situations between the forward vehicle and a rear vehicle, thereby supporting safe and flexible defensive driving and autonomous driving.

Hereinafter, specific methods for preventing collisions or serial collisions will be described. An object in front of a forward vehicle or a stationary situation object is defined as ObjFV, the forward vehicle is defined as FV, an ego vehicle is defined as EgoV, and a rear vehicle is defined as RV. FIG. 1 is a diagram illustrating a dangerous situation that may occur due to obscuring on the same driving path according to an embodiment of the present disclosure. FIG. 1 illustrates a case where when there is a vehicle that is stopped or traveling at a very low speed on a highway and the presence of the vehicle is unknown because it is obscured by a forward cargo vehicle, an ego vehicle brakes suddenly as the cargo vehicle turns and a rear vehicle suddenly brakes and decelerates. When a forward vehicle driving in front of the ego vehicle recognizes an object in front of the forward vehicle and stops or belatedly recognizes an accident situation, a driver of the forward vehicle quickly manipulates a steering wheel so that the forward vehicle avoids the object to the left or right, and the ego vehicle maintains an inter-vehicle distance in consideration of the driving speed and direction of the forward vehicle. However, since there is not enough time and distance to respond to abnormal situations in which an object ObjFV exists, collisions or serial collision accidents may occur. Since more dangerous situations may arise in situations where the forward vehicle avoids the object to the left or right or makes an emergency stop, an embodiment of the present disclosure proposes a system that enables defensive driving by sharing situation recognition results with surrounding vehicles.

Figure 2A:
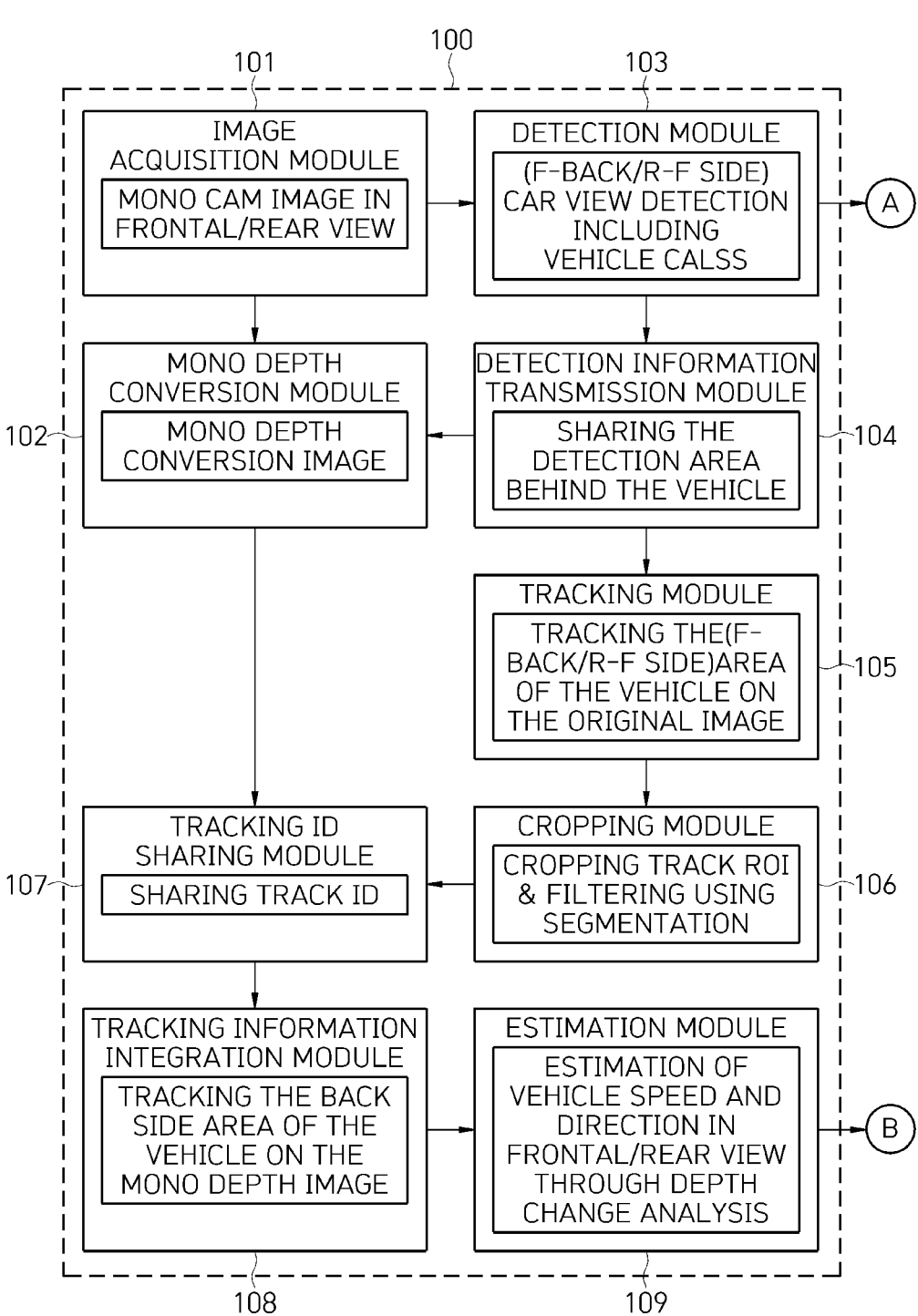
FIGS. 2A to 2C are diagrams illustrating a defensive driving system through forward vehicle driving situation judgement according to an embodiment of the present disclosure.
Figure 2B:
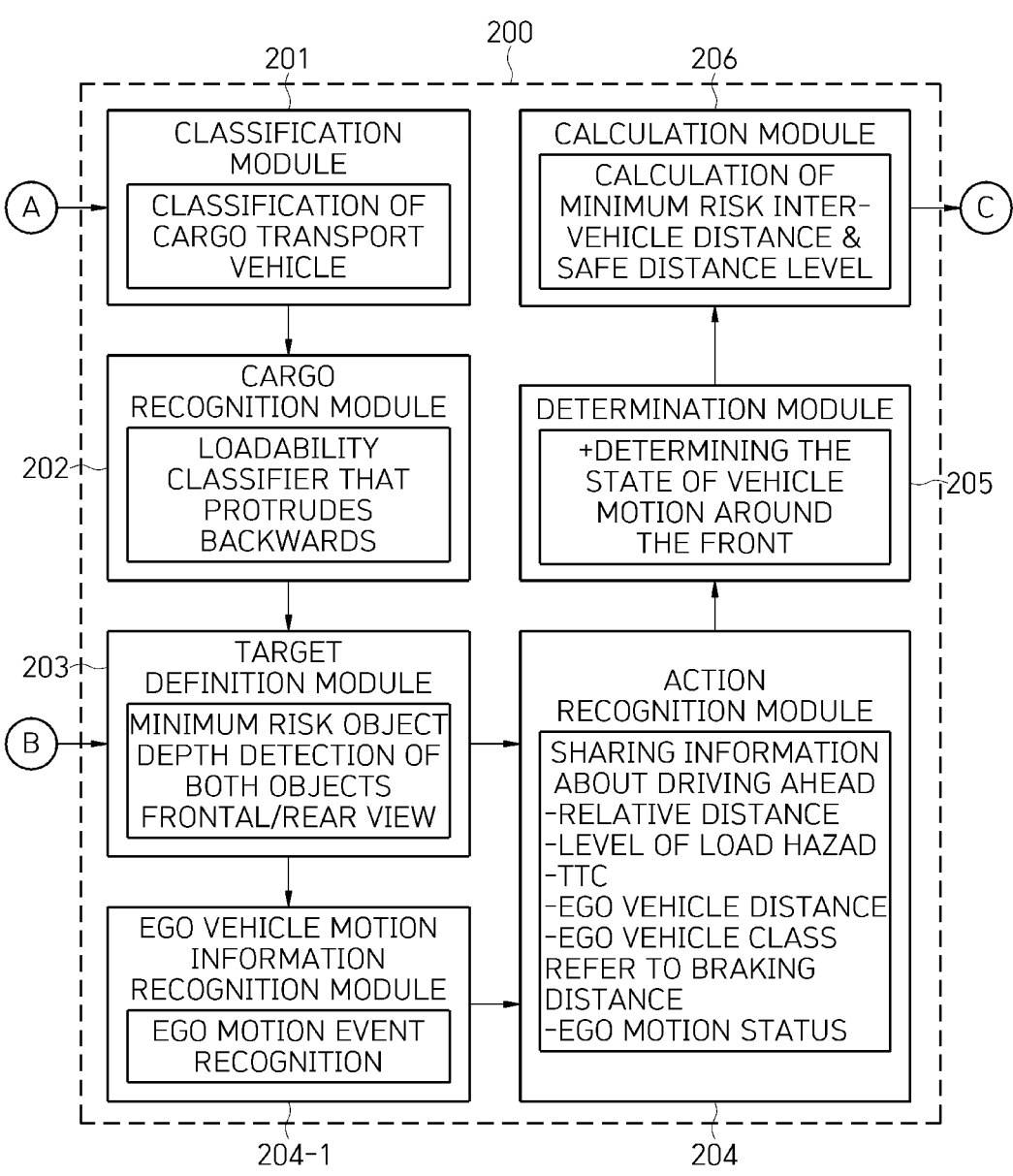
Figure 2C:
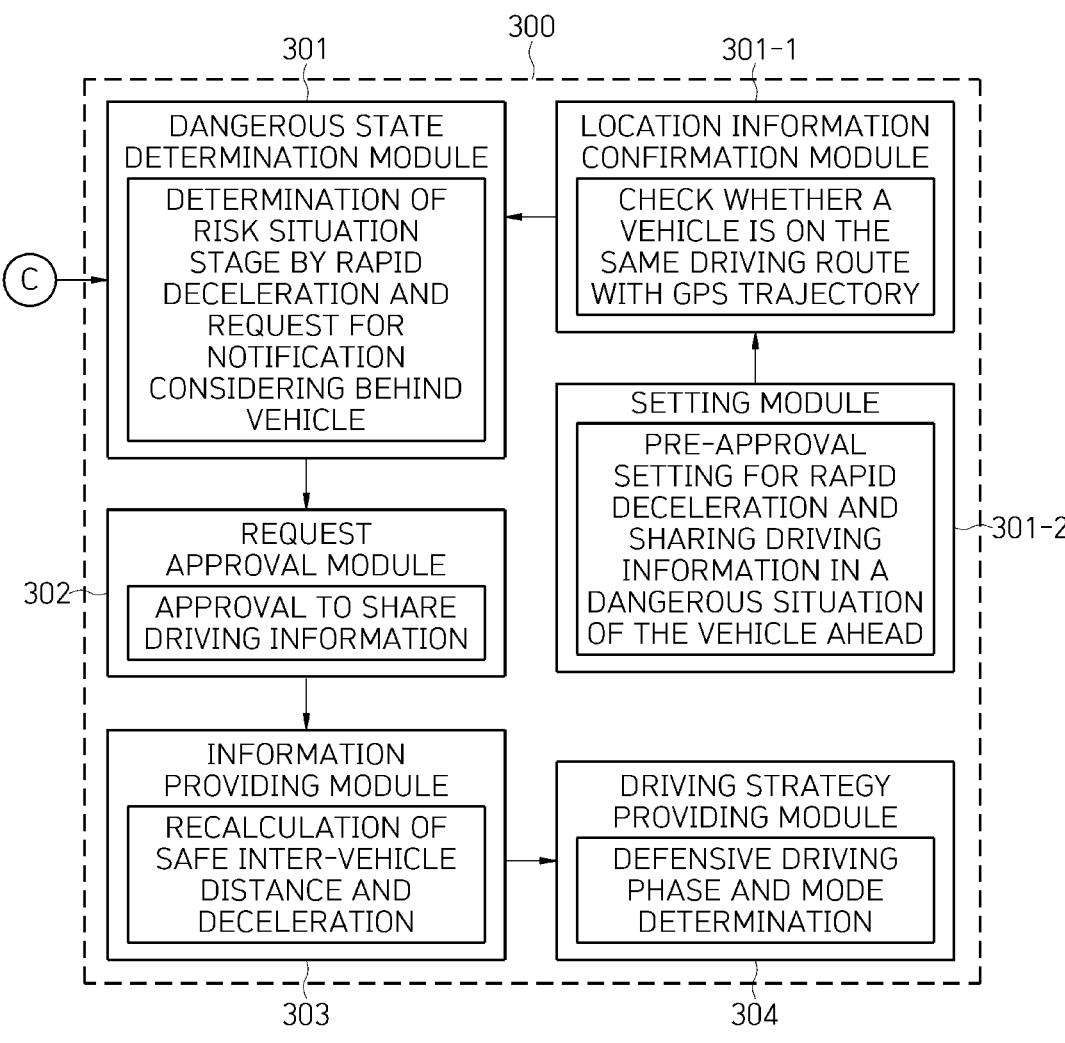

FIGS. 2A to 2C are diagrams illustrating a defensive driving system through forward vehicle driving situation judgement according to an embodiment of the present disclosure, FIG. 3 is a diagram illustrating defensive driving data sharing through forward vehicle situation analysis according to an embodiment of the present disclosure, and FIG. 4 is a diagram illustrating a risk level analysis method using ego vehicle movement information according to an embodiment of the present disclosure.

An inter-vehicle distance recognition unit 100 recognizes an inter-vehicle distance by photographing the rear of a forward vehicle and the front of a rear vehicle by using a mono camera, estimating location and speed information, and using specifications and braking characteristic information of an ego vehicle. A situation recognition unit 200 recognizes situation information including surrounding vehicle information or surrounding object information of the forward vehicle. A driving situation response determination unit 300 between forward and rear vehicles shares data for determining defensive driving action by using the situation information that is output information of the situation recognition unit 200.

Hereinafter, the function of the inter-vehicle distance recognition unit 100 will be described. The inter-vehicle distance recognition unit 100 uses the result of converting the input of the mono camera into mono depth, detects and classifies the rear of the forward vehicle, and generates and shares tracking information. Based on a shared track ID, the inter-vehicle distance recognition unit 100 filters accurate depth information about the rear area of the forward vehicle, calculates a minimum distance to the rear of the forward vehicle based on a bumper of the ego vehicle, and estimates driving information. An image acquisition module 101 acquires images by using the mono camera. Both the forward vehicle and the rear vehicle are equipped with at least one camera and share the system or receive recognition information from the forward vehicle and perform information processing. A mono depth conversion module 102 secures three-dimensional information by converting the acquired image into mono depth. A detection module 103 detects the rear of the forward vehicle and the front of the rear vehicle from the image received from the image acquisition module 101, and secures information for classifying the vehicle type. A detection information transmission module 104 shares detection information about the rear of the forward vehicle and the front of the rear vehicle secured by the mono depth conversion module 102 and the detection module 103. A tracking module 105 tracks the detection information about the rear of the forward vehicle and the front of the rear vehicle shared by the detection information transmission module 104, in an original image domain, and a cropping module 106 crops a detected area (cropping). A tracking ID sharing module 107 detects an object in the mono depth conversion image and matches a tracking ID with the features of the area cropped by the cropping module 106. The tracking ID output by the mono depth conversion module 102 includes three-dimensional location information about an object, and a tracking ID output by the cropping module 106 includes object shape information and direction information in the image domain. These object IDs pass through a network that extracts mutually matching features. A tracking information integration module 108 integrates shared tracking results in the domain converted to the mono depth, based on features in the three-dimensional space and features in the image in a backbone. An estimation module 109 estimates the speed and direction of the forward and rear vehicles (objects) by analyzing changes in depth over time by using three-dimensional information and two-dimensional information included in the integrated tracking ID, and transmits the estimated results to a target definition module 203 to be described below to select a target object to pay attention to.

Hereinafter, the function of the situation recognition unit 200 will be described. The situation recognition unit 200 recognizes a situation including surrounding vehicles or objects of the forward vehicle by using the integrated object information recognized by the inter-vehicle distance recognition unit 100. A classification module 201 performs a classification function for a cargo vehicle by using the rear area information of the forward vehicle and the front area information of the rear vehicle detected by the detection module 130. A cargo recognition module 202 operates a separate network that recognizes the classes of standardized cargo and types of cargo (for example, loads such as trees, large shipments, power poles, and rebar) protruding outside a loading box area in the case of trucks and cargo vehicles. The target definition module 203 receives motion information and state information about the forward and rear objects estimated in the 3-dimensional domain and 2-dimensional domain received from the estimation module 109, and determines target information by calculating a minimum distance between the ego vehicle and the forward or rear vehicle. Situation judgment needs to be performed to perform multimodal response by recognizing the state of an object or a vehicle to focus on while driving. To this end, the target definition module 203 not only sets one target, but also analyzes the location and action of target objects in real time based on distance information, speed information, and direction information between vehicles, and defines a safety level of a target. An action recognition module 204 uses forward and rear vehicle information and weight information output from the target definition module 203 and uses motion events of the ego vehicle to recognize action after detecting a dangerous situation. The action recognition module 204 receives the target motion information received from the target definition module 203 and ego vehicle motion information received from an ego vehicle motion information recognition module 204-1, and shares, with the forward and rear vehicles, the relative distance to the forward vehicle, the current hazard level considering the driving condition of the ego vehicle, collision time, overall length and width of the ego vehicle, type and braking distance of the ego vehicle, and ego vehicle motion state information.

Referring to FIG. 4, the ego vehicle motion information recognition module 204-1 according to an embodiment of the present disclosure performs recognition by fusing information affected by the forward vehicle and the surrounding vehicles based on the motion event of the ego vehicle. An ego vehicle information providing module 204-1A provides basic steering angle information, brake information, and acceleration information of the ego vehicle. A forward vehicle information providing module 204-1B provides information about the forward vehicle such as distance, speed, classification, and movement direction. A forward vehicle motion event recognition and weight calculation module 204-1C calculates weights by performing event recognition for a forward vehicle motion, and types of the motion recognition that determines the weights include sharp turn (when deviating from a preset value compared to an existing driving path), rapid deceleration (when decelerating at a slope exceeding a preset value), and emergency stopping (when stopping within a time within a preset value). According to an embodiment of the present disclosure, the forward vehicle motion event recognition and weight calculation module 204-1C recognizes the motion event and provides the forward situation and motion event recognition information of the ego vehicle as weights. An ego vehicle motion event recognition module 204-1D performs ego vehicle motion recognition in consideration of a situation in which a forward vehicle suddenly cuts in, a situation in which a driver or an operator suddenly takes control due to an abnormal situation in which the autonomous driving or driving assistance system does not recognize the surrounding situation, a situation in which a forward vehicle suddenly stops, a situation in which a stopped object is recognized late or not recognized, and the like.

A determination module 205 analyzes the information received from the action recognition module 204 to analyze the movement of the forward vehicle and its surrounding vehicles, and determines the state of the vehicle motion.

A calculation module 206 uses the information received from the action recognition module 204 and the determination module 205 to calculate a minimum distance at which the forward vehicle and the ego vehicle can safely respond. This is a different concept from the forward vehicle collision time (TTC), which is obtained by simply differentiating the relative distance to the forward vehicle by the current speed, and establishes a learning model by integrating information recognized by the ego vehicle about the state of the forward vehicle due to the actions of surrounding vehicles and information provided by the forward vehicle about a forward vehicle (vehicle located in front of the forward vehicle).

Figure 5A:
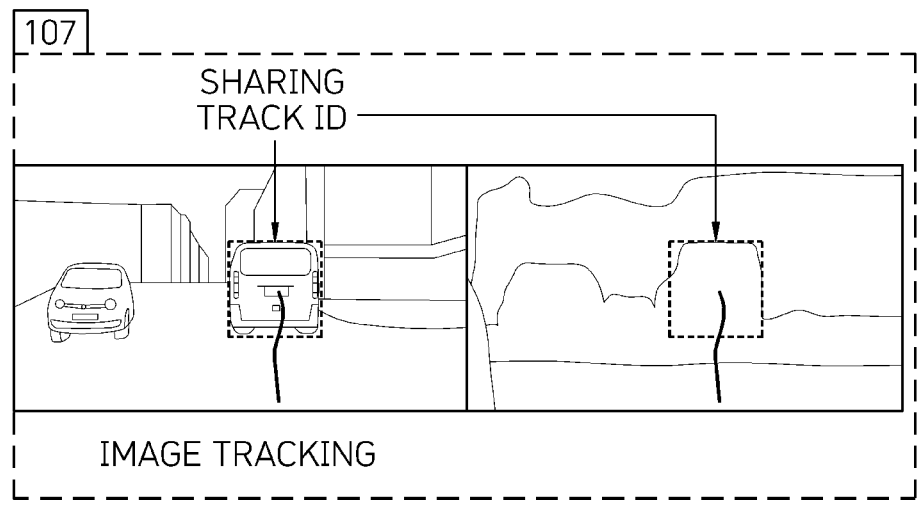
FIGS. 5A and 5B are diagrams illustrating a process of defining the same path and range for a forward vehicle according to an embodiment of the present disclosure.
Figure 5B:
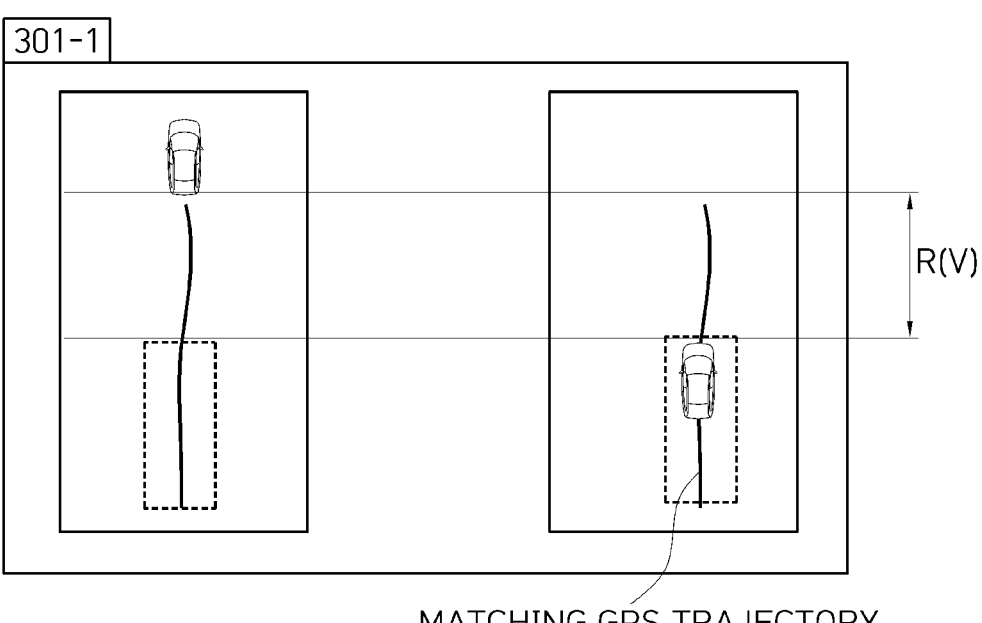

Hereinafter, the driving situation response determination unit 300 between forward and rear vehicles will be described. A dangerous state determination module 301 determines a dangerous state by using motion and state information determined by the ego vehicle. The dangerous state determination module 301 generates dangerous state information to prevent a collision in advance with a vehicle located behind the ego vehicle or a vehicle within a preset range. A setting module 301-2 determines whether to provide recognized information to vehicles within a specific service range according to the risk level or determines the priority of information sharing when sharing the recognized information with the forward and rear vehicles. A location information confirmation module 301-1 determines whether a vehicle is driving on the same path by using a specific service area or location information in order to confirm information sharing according to the risk level set by the setting module 301-2. FIGS. 5A and 5B are diagrams illustrating a process of defining the same path and range for a forward vehicle according to an embodiment of the present disclosure, and in which it is determined whether the path of the ego vehicle is within a certain range compared to the path of the forward vehicle based on GPS or depth-based path information in an image. In such a case, it is determined whether to designate the forward vehicle as a target vehicle based on a relative position range R(V) with the ego vehicle. A request approval module 302 approves a request to share dangerous state information in order to prevent collision with a rear vehicle. An information providing module 303 provides sudden braking information of the ego vehicle and dangerous state information of the forward situation in accordance with the approval of the information sharing request from the request approval module 302, and provides information on the distance to the forward and rear vehicles, including monitoring information, so as to prepare a response in advance before a rear vehicle confirms turning on of tail lights due to the brake operation of the ego vehicle. A driving strategy providing module 304 generates and provides a driving strategy of the ego vehicle to respond to a dangerous situation based on the state information of the forward vehicle, the state information of the rear vehicle, the distance information, and the state information of the ego vehicle received from the information providing module 303. The driving strategy of the ego vehicle is provided to the rear vehicle to prevent collisions with forward and rear vehicles and to provide information on smooth acceleration/deceleration and avoidance response, and the rear vehicle can intuitively confirm the defensive driving strategy.

Figure 6:
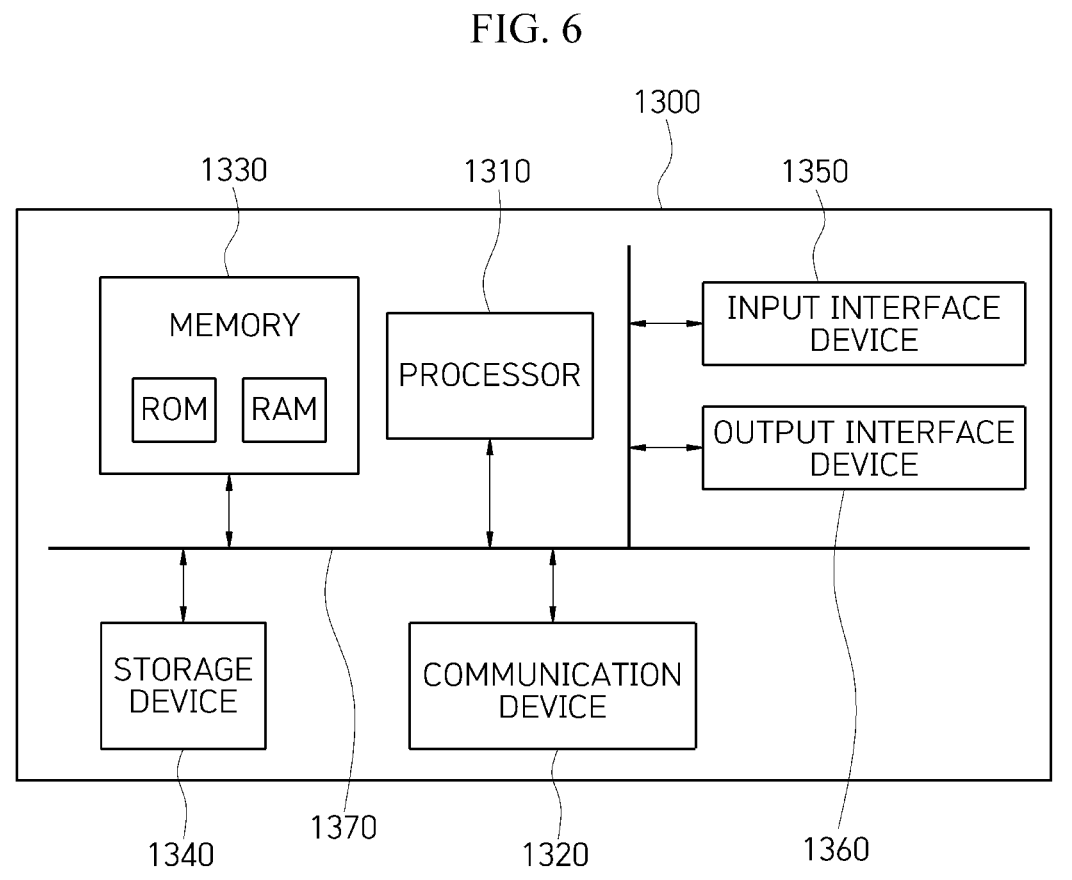

FIG. 6 is a block diagram illustrating a computer system for implementing a method according to an embodiment of the present disclosure.

Referring to FIG. 6, a computer system 1300 may include at least one of a processor 1313, a memory 1330, an input interface device 1350, an output interface device 1360, and a storage device 1340 that communicate with one another through a bus 1370. The computer system 1300 may also include a communication device 1320 coupled to a network. The processor 1310 may be a central processing unit (CPU) or a semiconductor device that executes instructions stored in the memory 1330 or the storage device 1340. The memory 1330 and the storage device 1340 may include various types of volatile or nonvolatile storage media. For example, the memory may include a read only memory (ROM) and a random access memory (RAM). In an embodiment of the present disclosure, the memory may be located inside or outside the processor, and may be connected to the processor through various known means. The memory is various forms of volatile or nonvolatile storage media, and for example, may include a read-only memory (ROM) or a random access memory (RAM).

Accordingly, an embodiment of the present disclosure may be implemented as a computer-implemented method or a non-transitory computer-readable medium storing computer-executable instructions. In an embodiment, when executed by a processor, computer readable instructions may perform a method according to at least one aspect of the present disclosure.

The communication device 1320 can transmit or receive wired signals or wireless signals.

The method according to an embodiment of the present disclosure may be implemented in the form of program instructions that can be executed through various computer means, and recorded on a computer-readable medium.

The computer-readable medium may include program instructions, data files, data structures, and the like singly or in combination. The program instructions recorded on the computer-readable medium may be specially designed and configured for an embodiment of the present disclosure, or may be known to and usable by those skilled in the art of computer software. A computer-readable recording medium may include a hardware device configured to store and execute program instructions. Examples of the computer-readable recording medium may include magnetic media such as hard disks, floppy disks, and magnetic tapes, optical media such as CD-ROMs and DVDs, and magneto-optical media such as floptical disks, a ROM, a RAM, and a flash memory. The program instructions may include not only machine language code such as that generated by a compiler, but also high-level language code that can be executed by a computer through an interpreter or the like.

Although the embodiments of the present invention have been described in detail above, the scope of the present invention is not limited thereto, and various modifications and improvements made by those skilled in the art using the basic concept of the present invention defined in the following claims are included in the scope of the present disclosure.

What is claimed is:

1. An autonomous driving predictive defensive driving system through an interaction based on forward vehicle driving and situation judgement information, the autonomous driving predictive defensive driving system comprising a processor and memory configured to implement:

an inter-vehicle distance recognition unit configured to recognize a distance between a surrounding vehicle and an ego vehicle;

a situation recognition unit configured to recognize situation information including surrounding information of the surrounding vehicle; and a driving situation response determination unit configured to share data for determining a defensive driving action by using the situation information;

wherein the inter-vehicle distance recognition unit comprises:

an image acquisition module configured to acquire an image by photographing a rear of a forward vehicle and a front of a rear vehicle using a mono camera;

a mono depth conversion module configured to convert the image into mono depth to secure three-dimensional information;

a detection module configured to detect the rear of the forward vehicle and the front of the rear vehicle from the image and to secure information for vehicle type classification;

a tracking module configured to track detection information about the rear of the forward vehicle and the front of the rear vehicle in an original image domain;

a tracking information integration module configured to integrate tracking results of the tracking module in a mono depth-converted domain; and an estimation module configured to estimate a speed and a direction of the forward vehicle and the rear vehicle by analyzing changes in depth over time;

wherein the situation recognition unit comprises:

a cargo recognition module configured to recognize a class of cargo protruding outside a cargo box or loading box area of a cargo vehicle;

a target definition module configured to collect motion information and state information of forward and rear objects from the inter-vehicle distance recognition unit, determine target information, analyze a location and an action of the target objects based on distance, speed, and direction information, and define a safety level of the targets;

an action recognition module configured to use forward and rear vehicle information output from the target definition module and to recognize an action associated with a dangerous situation after detecting the dangerous situation using motion events of the ego vehicle, and to share with the forward and rear vehicles a hazard level associated with a driving condition of the ego vehicle, collision time, overall length and width of the ego vehicle, type and braking distance of the ego vehicle, and motion state information of the ego vehicle in consideration of a driving state of the ego vehicle; and a determination module configured to analyze information received from the action recognition module to analyze movements of the forward vehicle and surrounding vehicles;

wherein the driving situation response determination unit is configured to:

provide, to the forward vehicle and surrounding vehicles, sudden braking information of the ego vehicle and dangerous state information of a forward situation, provide distance information with the forward and rear vehicles before tail lights of the ego vehicle are turned on due to brake operation of the ego vehicle, and generate a driving strategy of the ego vehicle using state information of the forward vehicle, state information of the rear vehicle, distance information, and state information of the ego vehicle, and provide the driving strategy to the rear vehicle.

2. The autonomous driving predictive defensive driving system of claim 1, wherein the inter-vehicle distance recognition unit acquires location information by using a track ID for the surrounding vehicle, and tracks the surrounding vehicle in a domain.

* * * * *